(12) United States Patent
Gibson et al.

(10) Patent No.: US 7,657,844 B2
(45) Date of Patent: Feb. 2, 2010

(54) PROVIDING ACCESSIBILITY COMPLIANCE WITHIN ADVANCED COMPONENTRY

(75) Inventors: Becky J. Gibson, Westford, MA (US); Michael C. Wanderski, Durham, NC (US); Zhiling J. Zheng, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1211 days.

(21) Appl. No.: 10/836,883

(22) Filed: Apr. 30, 2004

(65) Prior Publication Data

US 2005/0246653 A1 Nov. 3, 2005

(51) Int. Cl.
- G06F 3/00 (2006.01)
- G06F 3/02 (2006.01)
- G06F 9/44 (2006.01)

(52) U.S. Cl. .............. 715/827; 715/829; 715/831; 715/773; 345/168; 345/172; 717/110; 717/111; 717/124

(58) Field of Classification Search ......... 715/825–829, 715/831, 771–773; 345/168, 172; 717/110, 717/111, 124

See application file for complete search history.

(56) References Cited

U.S. PATENT DOCUMENTS

| | | | | |
|---|---|---|---|---|
| 5,600,778 A * | 2/1997 | Swanson et al. | ............ | 715/762 |
| 5,883,626 A * | 3/1999 | Glaser et al. | ................ | 715/788 |
| 6,654,038 B1 * | 11/2003 | Gajewska et al. | ........... | 715/802 |
| 6,789,251 B1 * | 9/2004 | Johnson | ....................... | 717/100 |
| 6,889,337 B1 * | 5/2005 | Yee | ................ | 714/1 |
| 2002/0070977 A1 * | 6/2002 | Morcos et al. | ............. | 345/810 |
| 2002/0103914 A1 * | 8/2002 | Dutta et al. | ................. | 709/229 |
| 2002/0129100 A1 * | 9/2002 | Dutta et al. | ................. | 709/203 |
| 2002/0152255 A1 * | 10/2002 | Smith et al. | ................. | 709/102 |
| 2003/0058286 A1 * | 3/2003 | Dando | ......................... | 345/853 |
| 2003/0156130 A1 * | 8/2003 | James et al. | ................ | 345/728 |
| 2003/0172353 A1 * | 9/2003 | Cragun | ....................... | 715/517 |
| 2003/0234822 A1 * | 12/2003 | Spisak | ........................ | 345/827 |
| 2004/0145607 A1 * | 7/2004 | Alderson | .................... | 345/746 |
| 2004/0164991 A1 * | 8/2004 | Rose | .......................... | 345/589 |
| 2005/0039191 A1 * | 2/2005 | Hewson et al. | .............. | 719/317 |
| 2005/0120308 A1 * | 6/2005 | Gibson et al. | ............... | 715/779 |
| 2005/0144573 A1 * | 6/2005 | Moody et al. | ............... | 715/825 |
| 2005/0160065 A1 * | 7/2005 | Seeman | ........................ | 707/1 |

OTHER PUBLICATIONS

Ellen Francik, Computer-& screen -based interfaces: Universal design filter, Human Factors Engineering, Pacific Bell Version 2, Jun. 6, 1996.*

Art Griesser, "A generic editor Full text," pp. 50-55, 1997 ACM Press NewYork, NY, USA.*

Bohman, Paul, "Introduction to Web Accessibility", Oct. 2003, WebAIM, printed Apr. 17, 2004, <http://www.webaim.org/intro/?templatetype=3> (p. 1-6).

Caldwell, Ben, et al., "Web Content Accessibility Guidelines 2.0, W3C Working Draft Mar. 11, 2004", World Wide Web Consortium (p. 1-56).

(Continued)

*Primary Examiner*—Tadeese Hailu
(74) *Attorney, Agent, or Firm*—Marcia L. Doubet (57) ABSTRACT

Accessibility compliance is provided within advanced componentry, such as a browser in which an on-demand editor can be launched. A toolkit of functionality that is executable on a server is preferably provided, from which selections can be made to configure an instance of a client editor or similar client-side viewer. Techniques are disclosed that enable flexible specification of the controls to be added to the viewer instance, as well as specification of details for configuring the controls.

23 Claims, 6 Drawing Sheets

OTHER PUBLICATIONS

Jacobs, Ian, et al., "User Agent Accessibility Guidelines 1.0, W3C Recommendation Dec. 17, 2002", World Wide Web Consortium (p. 1-4).

Jacobs, Ian, et al., "User Agent Accessibility Guidelines 1/0, W3C Recommendation Dec. 17, 2002, 1. Introduction", World Wide Web Consortium (p. 1-10).

Jacobs, Ian, et al., "User Agent Accessibility Guidelines 1.0, W3C Recommendation Dec. 17, 2002, 2. The user agent accessibility guidelines", World Wide Web Consortium (p. 1-53).

Jacobs, Ian, et al., "User Agent Accessibility Guidelines 1.0, W3C Recommendation Dec. 17, 2002, 3. Conformance", World Wide Web Consortium (p. 1-19).

Jacobs, Ian, et al., "User Agent Accessibility Guidelines 1.0, W3C Recommendation Dec. 17, 2002, 4. Glossary", World Wide Web Consortium (p. 1-23).

Jacobs, Ian, et al., "User Agent Accessibility Guidelines 1.0, W3C Recommendation Dec. 17, 2002, 5. References", World Wide Web Consortium (p. 1-6).

Treviranus, Jutta, et al., "Authoring Tool Accessibility Guidelines 1.0, W3C Recommendation Feb. 3, 2000", World Wide Web Consortium (p. 1-22).

* cited by examiner

```
300
                                               311
    <editor:createEditor name="MyEditor" KeyMap="keys.properties">
310      <editor:addToolbar name="MyToolbar" definition="toolbar.jsp">
    320      <editor:addControl visible="true" name="BoldButton"
         330      definition="button.jsp" text="Bold" image="bold.gif"/>
             <editor:addControl visible="true" name="ItalicButton"
         340      definition="button.jsp" text="Italic" image="italic.gif"/>
         </editor:addToolbar>
350      <editor:addControl visible="false" name="ColorPicker"
              definition="id:colorpicker"/>
    </editor:createEditor>
```

510 —— MyToolbar.[IE5.5].keyCode = 17:13
520 —— MyToolbar.BoldButton.[IE5.5].keyCode = 17:14
530 —— MyToolbar.ItalicButton.[IE5.5].keyCode = 17:15
540 —— ColorPicker.[IE5.5].keyCode = 17:16

PROVIDING ACCESSIBILITY COMPLIANCE WITHIN ADVANCED COMPONENTRY

BACKGROUND OF THE INVENTION

1. Field of the Invention

The present invention relates to computer programming, and deals more particularly with providing improved accessibility for users interacting with computer-rendered information (such as a Web page rendered in a browser).

2. Description of the Related Art

Over the past few years, the pendulum of technology used to build Web sites and Web applications has swung from relatively simple, such as Web pages with primarily static content, to rich, dynamic, and interactive content interfaces. Advanced client-side technology supporting today's rich content includes browser plug-ins, Java™ applets, and vector-graphics animation programs. Although these rich client-side controls offer advantages in functionality, they also suffer from drawbacks. Examples include requiring a large download footprint on the client and a lack of portability across operating systems and/or browsers. ("Java" is a trademark of Sun Microsystems, Inc. in the United States, other countries, or both.)

Recently, however, big strides have been made in advanced scripting-based technology (such as JavaScript™ or Visual-Basic scripting code), and this approach has been adopted by most commonly-used browsers as a means of manipulating page content after it has been loaded into the browser. For example, the Hypertext Markup Language ("HTML") syntax for a Web page may include JavaScript code that, when executed, changes an already-rendered Web page. As one example, a rendered image can be removed from a page by executing JavaScript code that programmatically removes the image node from the Document Object Model ("DOM") tree corresponding to the rendered page. As another example, JavaScript code might execute to alter the visual appearance of rendered text. It should be noted that while JavaScript code enables use of relatively advanced client-side capabilities, support for processing the scripts is typically built into browsers. JavaScript support is therefore considered as having a zero footprint, and does not share that particular drawback of other rich client-side technologies. ("JavaScript" is a trademark of Sun Microsystems, Inc. in the United States, other countries, or both.)

The ubiquity and functionality of the rich client-side technologies allows Web page application designers to create complex and highly interactive page content. Platform developers have moved to supporting these client-side technologies in combination with server-side componentry such as portals/portlets, servlets, and JavaServer Pages™ ("JSP"™) technology, thereby providing platforms that support advanced Web application development and delivery along with centralized (i.e., server-side) management of the applications. ("JavaServer Pages" and "JSP" are trademarks of Sun Microsystems, Inc. in the United States, other countries, or both.)

Unfortunately, unlike simple Web-based content, advanced scripting-based technology lacks resources and standardized support for key features such as accessibility. "Accessibility", as that term is used herein, refers to the ability of all users to access Web-based content, without regard to a user's impairments or disabilities. Providing accessible content and applications is extremely important. Standardization bodies such as the World Wide Web Consortium, or "W3C", have developed accessibility guidelines that include "Web Content Accessibility Guidelines 2.0" (a W3C Working Draft dated 11 Mar. 2004), "User Agent Accessibility Guidelines 1.0" (a W3C Recommendation dated 17 Dec. 2002), and "Authoring Tool Accessibility Guidelines 1.0" (a W3C Recommendation dated 3 Feb. 2000). However, no existing guidelines are known to the present inventors that fully address the particular needs of the class of complex Web applications that are built to leverage advanced client-side technologies.

Accordingly, what is needed are techniques for providing accessibility compliance within advanced scripting-based componentry.

SUMMARY OF THE INVENTION

An object of the present invention is to provide accessibility compliance within advanced scripting-based componentry.

Still another object of the present invention is to provide improved accessibility for users of screen readers and/or talking browsers.

Another object of the present invention is to provide techniques to enable color settings in certain rendered content to be preserved even though a contrast mode of the client device may be changed.

A further object of the present invention is to enable users to more easily interact with rendered content.

Yet another object of the present invention is to provide improved document editing capabilities for users.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, computer program products, and/or services. In a first aspect, a dynamically-configured, accessible editor is provided. This aspect preferably further comprises: providing a plurality of selectable editing functions; specifying, for a particular instance of the accessible editor, selected ones of the provided editing functions that are to be available; and upon activating the editor instance, making the specified selected ones available.

Preferably, the available selected ones are available, to a user of the editor instance, using only keyboard input. Each of the available selected ones is preferably selectable from the editor instance using a predetermined sequence of one or more keys. The predetermined key sequence for each of the available selected ones is preferably specified in a mapping between the specified selected ones and the predetermined key sequences.

The predetermined key sequence for each of the available selected ones may be dependent upon a locale in which the editor instance is activated, and/or upon a user agent from which the editor instance is activated.

Preferably, one or more of the selected ones operates to enable activating a detached toolbar. In this case, the selected ones may also include at least one editing function that applies to a document portion selected in the editor instance. The detached toolbar may be automatically launched, responsive to detecting a predetermined key sequence that is defined as causing the automatic launch. In this case, focus for user input preferably switches to the detached toolbar when the toolbar is launched, without altering a current selection status of content rendered in the editor instance.

In addition or instead, at least one of the selected ones preferably operates to enable applying an action to a document portion selected in the editor instance.

One or more of the selected ones may operate to enable activating a detached color-selection mechanism in which a selection can be made from among a plurality of colors, such that the plurality of colors is unaffected by color contrast changes made to a device on which the editor instance is activated. The plurality of colors is preferably provided as a single image, and the selection is preferably facilitated by providing mapping regions, each of which has a boundary that generally corresponds to a boundary of a different one of the colors. The regions are preferably invisible.

Optionally, a document rendered in the editor instance may be programmatically modified to enforce predetermined accessibility issues. The programmatic modifications may include programmatically altering image references in the document to include a textual description of a source of the referenced image and/or programmatically changing input areas of forms in the document to textual labels that include, as values, text from the input areas. Preferably, the programmatic modifications are carried out by applying a style sheet that specifies the programmatic modifications.

By way of example, this aspect may be provided as a service wherein one or more of the providing, specifying, and making steps are carried out by a third party or for compensation in some form.

In another aspect, a dynamically-configured, accessible content viewer is provided. This aspect preferably further comprises: providing a plurality of selectable functions; specifying, for a particular instance of the accessible content viewer, selected ones of the provided functions that are to be available; and upon activating the content viewer instance, making the specified selected ones available such that each of the available selected ones is selectable from the content viewer instance using a predetermined sequence of one or more keys. This aspect may further comprise determining, when user input is received, which of the available selected ones should be activated by consulting a mapping that associates each of the specified selected ones with a predetermined sequence of one or more keys usable for providing user input.

In still another aspect, color-sensitive information is provided on a display by rendering a color-selection image comprising a plurality of colors, wherein a plurality of mapping regions is associated with the image, each of the mapping regions having a boundary that generally corresponds to a boundary of a different one of the colors. A selection within the boundary of a particular one of the mapping regions is then interpreted as a selection of the color to which to boundary of the particular one generally corresponds. The regions may be invisible, and the selection within the boundary may be made (for example) using keyboard input or using input from a pointing device such as a mouse.

The present invention will now be described with reference to the following drawings, in which like reference numbers denote the same element throughout.

BRIEF DESCRIPTION OF THE DRAWINGS

FIG. 6 (comprising FIGS. 6A and 6B) provides an illustration of a pop-up color-picker window, according to preferred embodiments.

DESCRIPTION OF PREFERRED EMBODIMENTS

The present invention provides accessibility compliance within advanced componentry, and in particular, within advanced scripting-based browser componentry. Using techniques disclosed herein, users with various impairments or disabilities will benefit from improved content interactions. Several representative accessibility problems solved by embodiments of the present invention will now be described. It should be noted that techniques disclosed herein may also be advantageous for users who are not impaired, and thus references herein to addressing accessibility problems are by way of illustration but not of limitation.

Blind and low-vision users typically rely on screen readers or talking browsers to interact with Web applications. Typically, talking browsers do not offer the same level of sophistication as screen readers, which are designed to work with the operating system and all applications running under it. Subsequent discussions are in the terms of screen readers, by way of illustration (and references to "browsers" hereinafter are intended to refer to browsers in general, rather than talking browsers, unless the text or context of the reference indicates otherwise).

A number of screen readers are commercially available. Often, vendors make modifications to a particular screen reader, using its application programming interface or "API", to work with the vendor's software product. As a result, the software product is not portable for use with other screen readers. Similarly, if a software product exploits screen reader capabilities that depend upon features of a particular operating system, the software product is not generally portable across operating systems.

Talking browsers and screen readers have several drawbacks that make creating a system that supports a dynamic, rich, interactive content interface—while at the same time complying with accessibility requirements—a difficult undertaking.

When used with content rendered in a browser, most screen readers evaluate the DOM tree nodes for a page that has been loaded, and read the entire page to the user by an in-order traversal of these DOM tree nodes.

Many existing browsers have technology that enables updating the DOM tree for only the changed parts of an already-loaded page, rather than requiring the entire page to be reloaded. This can provide a significant performance improvement for large or complicated Web pages. However, this "partial reload" technology will not work with current screen readers. Therefore, Web page developers must be careful when using sophisticated JavaScript routines that change the contents of the rendered output on the fly (e.g., by performing calls to the document.write( ) method).

In order to use a screen reader, an application should be fully keyboard-accessible. That is, all functions and actions that can be performed on rendered content should be available to the user without requiring use of a mouse. Screen reader support is tied very closely to keyboard accessibility. That is, someone using a screen reader is not using a mouse, but rather is using only the keyboard for navigation. Typically, screen readers can only read text (and, as stated above, read the text in order of the DOM tree traversal). Some screen readers are adapted for reading selected standard HTML fields and elements, such as speaking the content of <input>, <select>, and <a> (i.e., anchor) tags as well as contents of table cells. However, it can be quite difficult to provide full keyboard support in Web pages that use complicated styles (such as different font sizes, colors, or typefaces).

Another major problem in providing accessibility pertains to focus. Suppose the user is viewing content in a browser, and then invokes an on-demand editor to perform some type of editing upon that content. (The term "on-demand editor", as used herein, refers to an editor that does not need to be installed or loaded on the user's computing device. Rather, the editing functions are made available by interacting with server-side code that provides the implementation of these editing functions.) Typically, editing a document with this type of interface requires first selecting some portion of the rendered document, and then selecting an action to be applied to that selected document portion, such as applying some formatting. The user might wish to change a word or phrase to bold or italics, or to change the word or phrase so that it is underlined or uses a "strike-through" appearance, for example.

When using a mouse, an editing operation of this type is relatively simple. The user selects the word or phrase, typically by double-clicking the left mouse button to select a word over which the mouse cursor is positioned or by depressing the left mouse button when the mouse cursor points to the beginning of the word or phrase and keeping the left mouse button depressed while moving the mouse cursor to the end of the word or phrase. The selection is typically indicated for a sighted user through visual highlighting of the word or phrase. Then, while the word or phrase remains highlighted, the user moves the mouse cursor over (for example) a "Bold" or "B" icon on a toolbar and clicks the left mouse button. Responsive to clicking that icon, the highlighted word or phrase is changed to bold.

For the user who is interacting with an editor only via the keyboard, however, this editing operation is much different. The user can select a word or phrase using the keyboard, typically by using a keyboard "shortcut"—that is, a predefined sequence of one or more keys (referred to hereinafter as a "key sequence"), where this sequence is correlated to an action such as "select". To select the Bold icon from the toolbar might require using another keyboard sequence to set focus to the toolbar and yet another sequence to position the keyboard cursor to the correct icon on the toolbar. For example, a combination of the control ("Ctrl") key and the letter "T" might be required for moving focus to the toolbar, and the tab key might be adapted for moving between icons on the toolbar. However, once the user presses the tab key, the user's selection of the document portion is immediately lost. Preferred embodiments of the present invention therefore provide a "floating toolbar", also referred to herein as a "detached toolbar", to solve this problem.

Another approach for addressing the focus issue would be to provide a predefined key sequence, such as Ctrl+B, for setting an already-selected document portion to bold. Similarly, other key sequences could be provided for other editing functions, such as Ctrl+I for setting an already-selected document portion to italic. Many existing editors provide a number of key sequences of this type. However, when the number of different functions to be supported grows beyond a relatively small number, it becomes increasingly difficult for users to remember the key sequences. And, when an on-demand editor is accessed from within a browser, it may be difficult to define key sequences such that a proper determination can be made as to whether the sequence was intended for the browser or for the editor. In addition, combinations of perhaps three or more simultaneous key presses may be required for supporting a rich set of editing features. Users with impairments may find it difficult or impossible to perform these key presses. Thus, a prior art key sequence approach is not deemed sufficient for addressing accessibility.

According to preferred embodiments, the focus problem is addressed using a detached toolbar, as stated above. That is, a toolbar is preferably used for grouping controls that can be applied to a selected document portion, such as changing font sizes, colors, and other attributes. (A "control" to be provided in this manner may also be thought of as a command.) When a toolbar is needed for accessing controls, the user enters a key sequence that launches the toolbar, and (in preferred embodiments) the toolbar is rendered in a pop-up window. This approach enables maintaining focus in the original frame or window where the user is editing a document, but also allows the keyboard to be used to navigate the controls provided on this detached toolbar. This is a key advantage of preferred embodiments in maintaining a UI that is accessible. The manner in which a detached toolbar can be defined and launched is described in more detail below. (See the descriptions of FIGS. 2-5.) Using a detached toolbar rendered in a pop-up window, a visually-impaired user can highlight text or objects in the document, then iteratively apply functions (e.g., bold, underlining, etc.) until finished.

Another accessibility issue is high-contrast mode. For some users, it is difficult to distinguish colors on a display device. Some operating systems therefore provide a "high-contrast" mode, which can be selected to automatically enforce a high contrast difference between foreground and background colors on the display device. Typically, selection of this high-contrast causes any background colors defined in the HTML syntax for a Web page to be overridden by the system's high-contrast color (which may be selected by the user from predetermined choices). Changing colors of a Web page in this manner causes problems for any HTML elements of the page that have been written to depend on a particular background color attribute or style. For example, a particular Web page might specify that gray is to be used as a background color and white is to be used for the text to be rendered on that background. If the user selects a high-contrast mode where white color is used for the background, the operating system will programmatically replace the gray background with a white background, making the text completely indistinguishable from the background. Even if the Web page specifies a background color that differs from the system-supplied high-contrast background color, the specified color may be difficult to perceive on the new background. (Note that in some cases, the choices offered for high contrast mode change the background color as well as the color of text to be rendered on that background.)

Because of the potentially undesirable effect of high-contrast mode, Web page designers are encouraged not to rely on the use of color to distinguish items on a page. However, there are certain elements where maintaining the exact color of an item is important. One example is a color-selection dialog commonly provided by text editors. Using this type of dialog, the user can choose various colors for the text of a document being edited, for example. A color selection dialog or "color-picker" is provided for this purpose, and is typically implemented as a table where each cell has a different background color. The intent is for the user to click on the desired color cell to set a particular text color. This implementation will not work at all when high-contrast mode is enabled, however, because the background color of all cells in the table is overridden by the operating system to use the high-contrast color.

To provide an accessible color-picker, the color swatches must be usable in high-contrast mode and must be selectable with keystrokes. Preferred embodiments of the present invention provide a solution to this color-picker problem by using an image map. According to preferred embodiments, a single image is rendered for the color-picker, where this image is comprised of a number of different color swatches that appear to be independent from one another but are actually an inseparable part of the overall image. An invisible overlay for the image is provided, using image map facilities whereby regions (such as square or rectangular areas) are specified that correspond to the visual boundaries of the different swatches. Because the color-picker is no longer comprised of individual cells, changing the background color with the high-contrast mode has no effect on the colors in the image displayed to the user. The user's selection, after positioning the cursor over some color swatch, is conveyed according to which mapped region corresponds to that position.

It should be noted that while this image-mapping aspect of preferred embodiments is described herein with reference to a color-picker, this aspect can be generalized to any scenario where the color value of an item is important and needs to be retained even if the background color is changed by selecting high-contrast mode. Furthermore, this image-mapping aspect is not limited to keyboard navigation environments, and may be used advantageously by users who interact with content using a mouse or other pointing device (for example, by clicking the left mouse button when the mouse cursor is positioned inside one of the mapping regions to indicate selection of the color corresponding to that mapping region).

Figure 1:
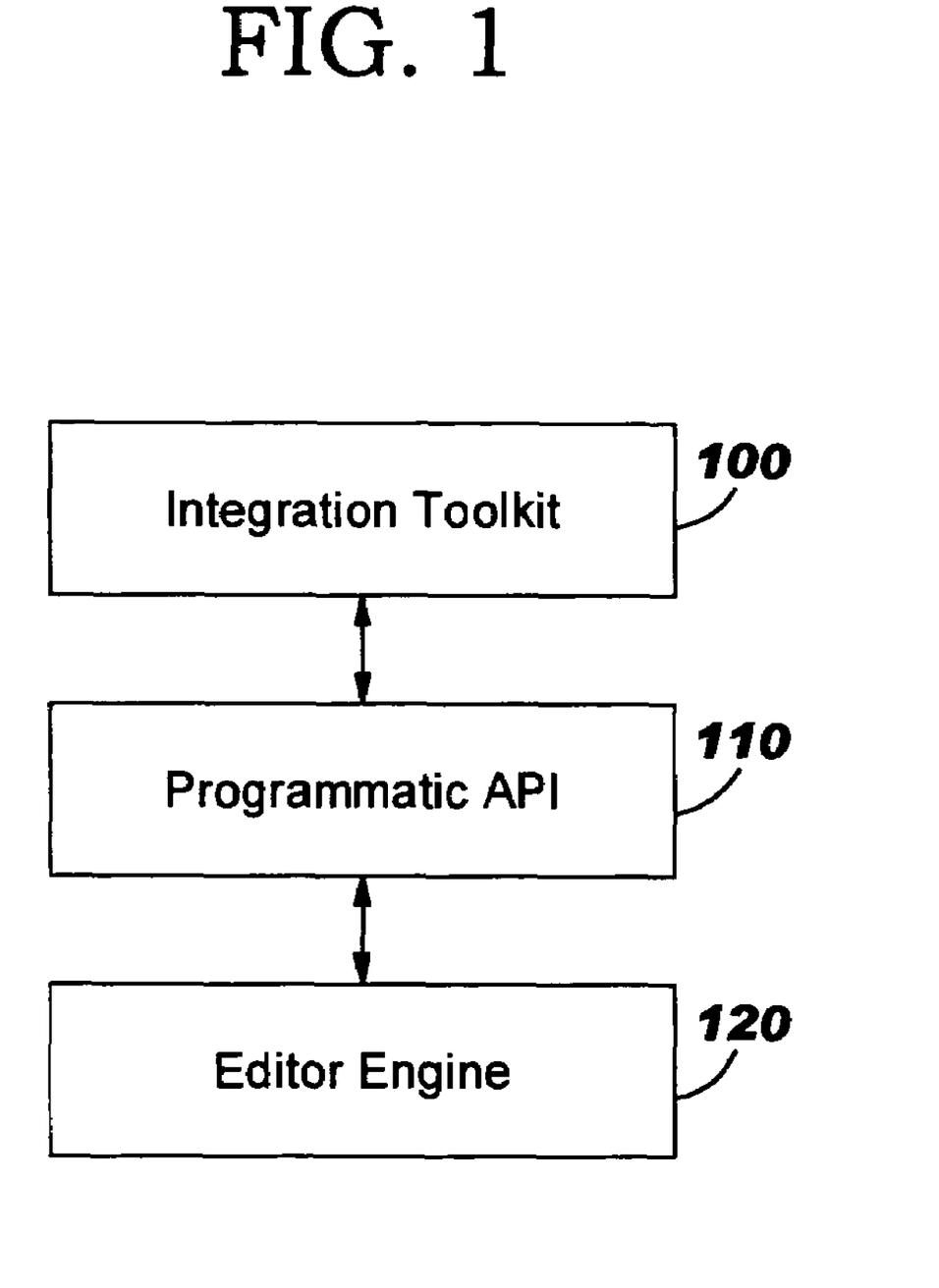
FIG. 1 illustrates an abstract model of an on-demand editor in which preferred embodiments may be used.

Reference was made earlier to using an on-demand editor. FIG. 1 illustrates, at an abstract level, how an on-demand editor might be modeled. As shown therein, components comprising the editor may include an integration toolkit 100, a programmatic API 110, and an editor engine 120. Each of these components will now be described.

An integration toolkit 100 of preferred embodiments provides code elements for controls (e.g., buttons, drop-down lists, etc.) that can be selected when designing a user interface, where these controls enable invocation of particular functionality. The specific controls provided by a particular implementation of the toolkit 100 may vary, and controls may be contributed to the toolkit from different sources. The integration toolkit also enables creating unique mappings between key sequences and accessibility controls (as will be described in more detail with reference to FIG. 5).

The programmatic API 110, according to preferred embodiments, is a collection of JavaScript functions that can be used to programmatically interact with, or modify, the document currently loaded into the editor engine. The controls which are selected from toolkit 100 preferably call this API.

The editor engine 120 provides a view of the currently-loaded document. According to preferred embodiments, this editor engine may be invoked while viewing a Web page or document in a browser, and provides the user with access to a number of advanced controls from the toolkit, such as controls for text manipulation, dragging and dropping objects, and resizing images. When a control is invoked at run-time, a call is made to the API 110, and that call typically executes to cause editor engine 120 to change the rendered content in some way.

Figure 2:
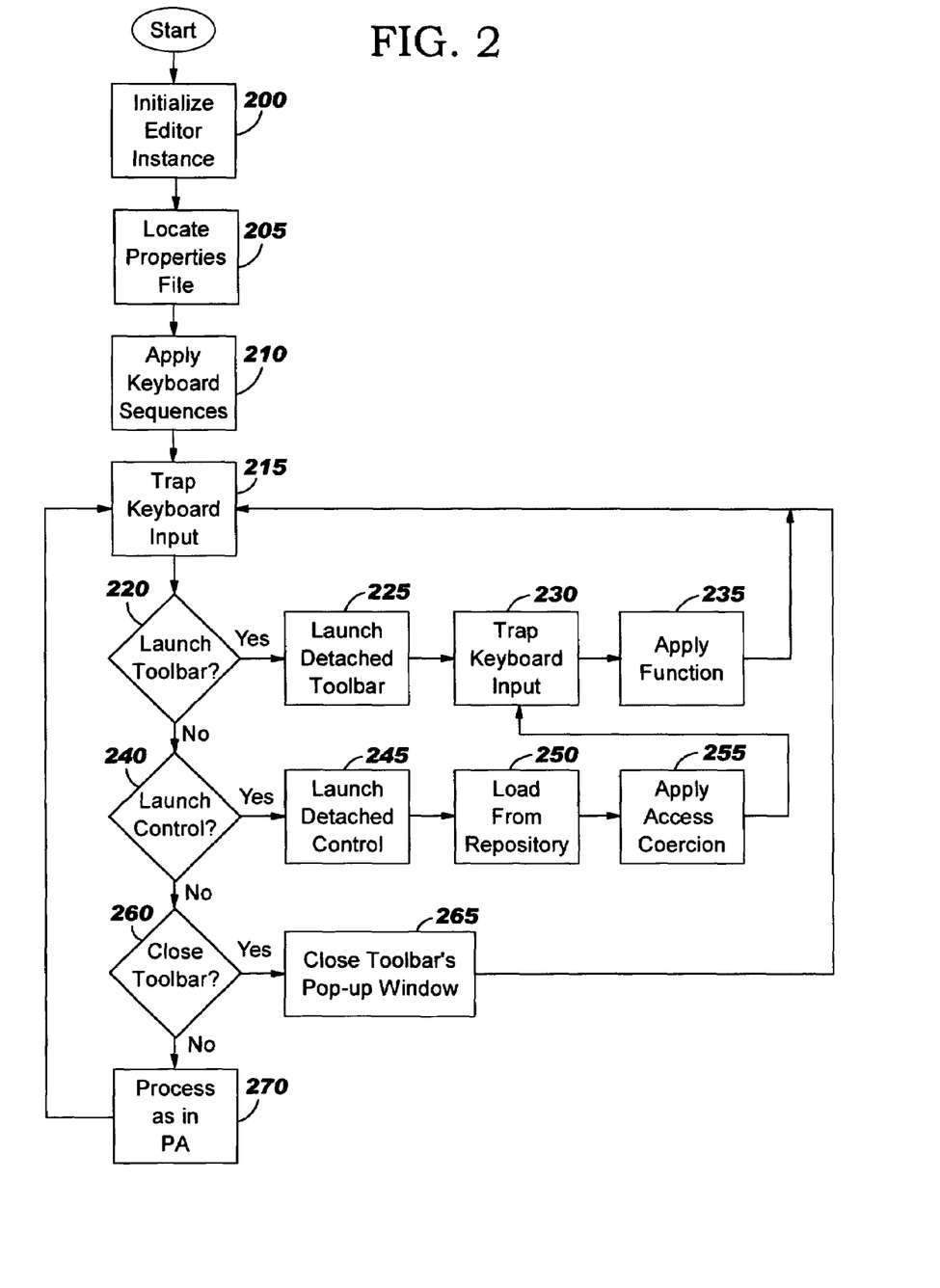
FIG. 2 provides a flowchart illustrating a logic flow that may be used to provide accessibility compliance within advanced componentry, according to preferred embodiments of the present invention.
Figure 3:
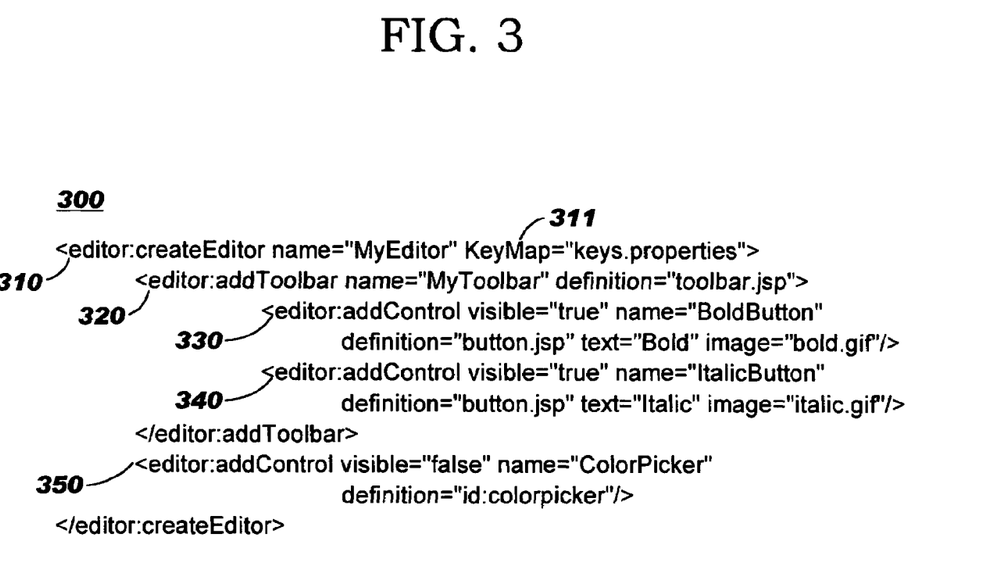
FIG. 3 provides a sample definition file of the type that may be used to configure editors and toolbars, according to preferred embodiments.

FIG. 2 provides a flowchart illustrating a logic flow that may be used to provide accessibility compliance within advanced componentry, according to preferred embodiments of the present invention. As shown therein, an editor instance is initialized and its toolbar(s) is/are populated (Block 200). Preferably, this comprises locating and processing a definition file that has been previously created to reference one or more selected controls from the integration toolkit. A sample definition file 300 is shown in FIG. 3, and is discussed below. A default version of the definition file may be created, and user-specific customizations may optionally be applied to that default file. The user-specific customizations may be performed by the users or by another person such as a systems administrator. Or, each user may create his or her own definition file. (The definition files may be created in various ways without deviating from the scope of the present invention.)

As noted earlier, according to preferred embodiments, the integration toolkit provides various user interface ("UI") controls that can be selected within the definition file, and this definition file specifies which controls should be configured for the present instance of the on-demand editor. Preferably, a combination of JSP fragments is provided in the toolkit to serve as the UI definitions for particular controls, along with a flexible custom tag library that enables referencing the controls and attributes thereof. These application fragments can then be dynamically assembled, thereby enabling the UI to be constructed dynamically according to the needs of the embedding application (and any user-specific customizations). In preferred embodiments that use an on-demand editor, the UI is built on the server and returned to the client for rendering. This allows a highly flexible platform for adapting the editor UI.

The sample definition file 300 in FIG. 3 will now be described. In this example, an "editor" namespace has been used to prefix the tag names. In this sample syntax, a <createEditor> tag 310 signals that this is the start of configuration information for the editor instance, and the <addToolbar> tag 320 defines a toolbar instance to be inserted into that editor instance. Another control is defined for use with this editor instance by <addControl> tag 350. A "name" attribute is preferably provided on the <createEditor> tag 310, <addToolbar> tag 320, and <addControl> tag 350 to enable uniquely identifying the editor definition, the toolbar definition, and the control, respectively. The <createeditor> tag 310 preferably also includes a "KeyMap" attribute whereby a particular predefined file can be referenced that specifies mappings between controls and key sequences. (A sample mapping is provided in FIG. 5, and is discussed below.) Preferably, the <addToolbar> tag 320 includes a "definition" attribute whereby code for a particular predefined toolbar can be referenced (and in this case, the reference is to a JSP named "toolbar.jsp"), and the <addControl> tag 350 includes a "definition" attribute whereby code for this control can be referenced (as discussed in more detail below).

When specified as a child element of an <addToolbar> tag, the <addControl> tag, examples of which are shown at 330, 340, is used to specify how its associated toolbar should be populated. In this sample syntax, a "visible" attribute of each <addControl> tag specifies, for this control, whether a representation of the control will be rendered on the toolbar. When the "visible" attribute is set to "true", a corresponding "image" attribute is used to identify the image to be rendered on the toolbar. Thus, for the controls named "BoldButton"

and "ItalicButton", the files "bold.gif" and "italic.gif" identify images (such as a bold letter "B" and an italicized letter "I") to be rendered on the toolbar, respectively. See reference numbers 330 and 340. Visible controls may be rendered as buttons, icons, lists, and so forth. Preferably, textual representations of these visible controls are also specified, as shown by the "text" attribute. This attribute's value should be set to a descriptive word or phrase, and a screen reader may use this value when guiding a user through the selections available on the toolbar. A "definition" attribute on the <addControl> tag specifies where the corresponding control functionality is defined, as noted earlier. When the user selects the visible representation of the control while editing a document, the code at this location is invoked. Thus, if the user selects the toolbar representation of the bold control defined at 330 or the italics control defined at 340, the code in the file named "buttonjsp" or "italicjsp" will be applied to the currently-selected document portion—and in this example, will presumably change the selected document portion to bold or italicized font, respectively.

Controls that are not part of a toolbar may also be defined for an editor instance. When the "visible" attribute is set to "false", as in <addControl> tag 350, the control is not rendered as part of the toolbar. Instead, the user interacts with this control through a separate pop-up window, in preferred embodiments, that contains another panel where more input can be provided to apply a function to the document. As shown in the example at 350, a color-picker is one example of the type of non-visible control that may be added to an editor instance in this manner. The "name" and "definition" attributes for a non-visible control are preferably analogous to that of the visible controls. In this example, the "definition" attribute of tag 350 begins with "id:" to signify, according to preferred embodiments, that the identifier of a repository-stored control is being referenced. Refer to FIG. 6, below, where the color-picker is described in more detail. (This "id:" notation might also be used in visible controls, although this has not been illustrated in the example.)

Figure 4:
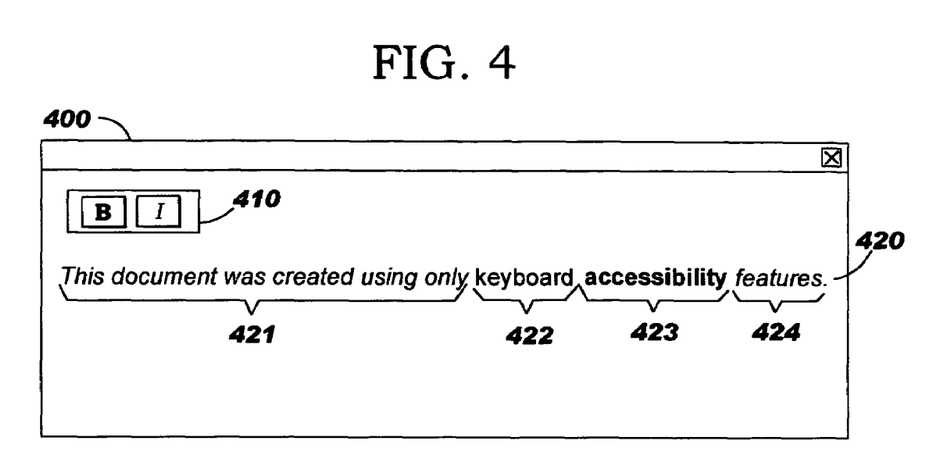
FIG. 4 shows a sample editor window containing a detached toolbar created according to the sample definition file provided in FIG. 3.

FIG. 4 shows a sample editor window 400 containing a detached toolbar 410 which has been populated according to the sample definition file 300 of FIG. 3 to include a button for selecting bold or italicized font. By way of illustration but not of limitation, in this example, the pop-up window in which toolbar 410 is rendered appears above the text 420 of the document being edited. Note that the user has used key sequences, according to the present invention, to interact with toolbar 410, thereby settings portions 421, 424 of the text to italics and portion 423 to bold, while leaving portion 422 in a normal font. (The manner in which the user indicates which document portion should be selected within the editor window does not form part of the present invention.)

Although a very simple definition file 300 is illustrated in FIG. 3, the syntax used for preferred embodiments is extensible and a definition file may therefore contain more than one toolbar definition and may specify varying numbers of controls for each such toolbar and/or more than one non-visible control. Thus, an editor instance can be adapted in a very flexible manner to the needs of a particular implementation.

After the editor instance is initialized and the toolbar(s) is/are populated at Block 200 of FIG. 2, Block 205 locates the properties file (i.e., the file containing the mappings between controls and key sequences) that is to be used with that editor instance. According to preferred embodiments, this comprises parsing the "KeyMap" attribute from each <createeditor> tag (see reference number 311 in FIG. 3) and, in an optional aspect, also determining the locale under which the editor instance will run (for example, by inspecting the standard properties file mechanism of the Java Developer's Kit, or "JDK"). The locale value may be used to identify a location-specific version of the properties file specified on the <createeditor> tag. So, for instance, the tag at 311 of FIG. 3 identifies a file named "keys.properties" as specifying the control-to-key sequence mappings for the editor instance named "MyEditor". If the locale value is "de", indicating that the locale of the user is likely to be Germany, then this optional aspect preferably concatenates the locale value to the file name (for example, as "keys_de.properties").

When determining the particular key sequences to be applied to each editor instance, preferred embodiments also consider which browser the editor instance will be used with and then select key sequences based on that browser. Preferably, the browser is determined by inspecting the value of the User-Agent field (where this field value is typically stored in configuration information of the browser), using techniques which are known in the art. (Embodiments of the present invention may be used with user agents other than browsers, and thus references herein to browsers are by way of illustration but not of limitation.)

In this manner, different key sequences for a particular control can be dynamically selected and loaded at run-time, based on user and/or browser preferences. This approach is especially valuable in providing keyboard accessibility, as each browser typically has a different set of reserved key sequences (and the key sequences in the properties file used by the present invention can therefore be tailored to avoid those browser-specific reserved key sequences) and each locale can use a different key sequence convention for common functions, if desired.

Figure 5:
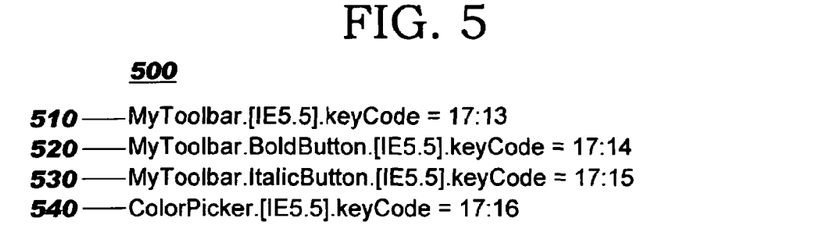
FIG. 5 depicts a sample properties file that corresponds to the sample toolbar defined in FIG. 3.

Once the properties file has been located at Block 205, Block 210 parses that file to locate the key sequences to use with the current editor instance being processed and then applies the located key sequences. A sample properties file 500 is depicted in FIG. 5 that corresponds to the editor instance 300, as specified at reference number 311 in FIG. 3. That is, properties file 500 is identified using the 'KeyMap="keys.properties"' name/value pair that appears in the tag at 311. (Note that each definition in sample file 500 that pertains to the toolbar also includes the toolbar name "MyToolbar", which appears on the "name" attribute of <addToolbar> tag 320, or, for non-toolbar entries, the value of the "name" attribute of another control such as the "ColorPicker" value of <addControl> tag 350, as discussed in more detail below.)

In preferred embodiments, a key sequence is defined in the properties file for each control that is to be added to the editor instance, including the non-visible controls as well as the visible controls. As one example syntax, the definitions may each be formatted using the following tokens and delimiters:

controlName.keyName.[browserName]
      .keyCode=keyCodeModifier: keyCodeAlphanumeric (Blank space has been added before and after the "." and ":" delimiters, in this illustration, merely for emphasis.)

In this syntax, a value for the controlName token matches the "name" attribute with which the control is specified on the <addToolbar> tag or on <addControl> tags that are defined as immediate child elements of the <createEditor> tag. See reference number 320 in FIG. 3, where the toolbar name is "MyToolbar". Thus, this same value is specified as the first token of the toolbar entry 510 in properties file 500 of FIG. 5. Similarly, a value for the controlName token on non-visible controls matches the "name" attribute from the corresponding <addControl> tag. Entry 540 of properties file 500 therefore begins with the name value from entry 350 in FIG. 3.

For <addControl> tags that are defined as child elements of an <addToolbar> tag, the keyName token shown above is also specified on corresponding entries in properties file 500 (and this token is preferably omitted on the properties file entries that define key sequence mappings for the toolbar itself and for non-visible controls). When used, a keyName token is separated from the controlName token with a delimiter. In preferred embodiments, this delimiter is "." (i.e., a period symbol). Thus, as illustrated at properties file entries 520, 530, a value is specified for the keyName token. The value for each keyName token matches the "name" attribute with which that control is specified on the corresponding one of the <addControl> tags. Thus, for example, the control associated with properties file entry 520 uses "BoldButton" as the value of the keyName token, thereby indicating that this mapping 520 is for the control specified at 330 in FIG. 3.

A browserName token is separated from the keyName token, when used, or from the controlName token otherwise, preferably using the same delimiter discussed above. In the sample properties file 500, the syntax "IE5.5" is used to identify the Internet Explorer browser, version 5.5. Note that square brackets are shown surrounding the browserName token in the syntax example shown above and within the properties file 500. In some cases, the browser identifier itself may include the value used for the token delimiter (e.g., the period symbol, which is commonly used when identifying software version numbers). These square brackets are therefore used in preferred embodiments to enable a parser to conclusively determine which token specifies the browser identifier. (Other predetermined symbols may be substituted, if desired.)

A reserved keyword is preferably used for the next token, and is shown in FIG. 5 as "keyCode". This token is separated from the browserName token by another instance of the "." delimiter. A second delimiter, which in preferred embodiments is "=" (i.e., an equal sign), separates the reserved token "keycode" from a keyCodeModifier token. This second delimiter separates the left-hand side of the key sequence definition from the right-hand side. The syntax that appears on the left-hand side of the key sequence definition, up to and including the reserved token, identifies the control for which a key sequence is being defined. The syntax that appears on the right-hand side of the key sequence definition, after the "=" delimiter, specifies the key sequence that is to be used at run-time to invoke this control. The syntax for specifying the key sequences will now be described.

The key sequence specification syntax begins with a keyCodeModifier token. This keyCodeModifier token is followed by a third delimiter, which in preferred embodiments is ":" (i.e., a colon symbol), and this delimiter is then followed by a keyCodeAlphanumeric token. In the examples shown in FIG. 5, a numeric value of 17 is specified as the keyCodeModifier token in each mapping definition 510, 520, 530, and 540. Each definition then has differing values for the keyCodeAlphanumeric token. In sample file 500, for example, the values for this token are shown as numeric values ranging between 13 and 16. (Alternatively, alphabetic values or a combination of alphabetic and numeric values could be used, if desired.) The key sequence definitions use values that correspond to the keys on the keyboard. As an example, the key sequence definition "17:14", which is used according to the mapping at 520 to invoke a function that sets a selected document portion to bold, corresponds to simultaneously pressing the Ctrl and "b" keys on the keyboard. As another example, suppose the mapping file 500 contained the following key sequence definition:

MyToolbar.InsertTable.[IE5.5].keyCode=17:19

(with a corresponding tag entry in the <createEditor> definition 300 of FIG. 3). In this example, the key sequence definition "17:19" is used according to this mapping to invoke a function that inserts a table at the current position in the document (assuming this function has been defined for the "InsertTable" keyName token) by simultaneously pressing the Ctrl and "t" keys on the keyboard.

While sample file 500 includes values identifying only the "IE5.5" browser in the browserName token, this file might also contain additional sets of entries to define the mappings for other browsers (as discussed above). In that case, entries 510-540 would be repeated, with changes occurring only in the browserName token and, when new key sequences are being defined for use with that browser, in either or both of the keyCodeModifier and keyCodeAlphanumeric tokens.

In an alternative approach, the name of the editor instance ("MyEditor", for sample file 300) may be prepended to each entry in the mappings file 500.

Returning again to the discussion of FIG. 2, the user begins interacting with the on-demand editor instance and that instance intercepts or "traps" the user's keyboard input (Block 215). The trapped input is then tested (Block 220) to see if the entered key sequence matches the key sequence for launching a toolbar. (With reference to the sample mappings defined in file 500 of FIG. 5, for example, the key sequence is tested to determine whether it corresponds to key 17 followed by key 13, as specified in the mapping at 510.) If this test has a positive result, control transfers to Block 225 to process the toolbar launch request. Otherwise, processing continues at Block 240.

In Block 225, the detached toolbar is launched. As stated earlier, preferred embodiments launch a toolbar in a pop-up window. Block 230 then traps the user's keyboard input while navigating this toolbar, and Block 235 applies the function indicated by this trapped input. For example, when the mappings defined in sample file 500 are used, the currently-selected document portion will be changed to italics if the key sequence 17, 15 is trapped.

In preferred embodiments, a detached toolbar remains open after applying a first control to the document, enabling the user to optionally select other controls to be applied. In this approach, the same key sequence used to launch the toolbar may be used to regain the focus when the focus reverts to the parent window upon executing the control on the document. (The processing of Block 225 may therefore be conditioned on whether the toolbar is already launched.) Thus, control returns to Block 215 following completion of Block 235.

Using a modal dialog window, as in the prior art, does not ensure accessibility to controls. This is because not all browsers support modal dialog windows, and a modal dialog window does not allow easy access to the information in the parent window (i.e., to the editor instance, in an editing scenario). The detached toolbar of preferred embodiments solves the focus-switching problem, as has been discussed. If it is desirable to support more than one detached toolbar concurrently in an embodiment of the present invention, each with its own simultaneously-displayed parent window (as may happen in a portal environment, for example), each pop-up window is preferably associated with its parent window using a dynamically-generated parent window name (typically a random number) plus a unique window control name that uniquely identifies the pop-up window. In this approach, all open pop-up windows preferably have their identifiers preserved in a data structure such as a table. Then, when a key sequence that requests returning focus to (or closing) a toolbar is intercepted, this table can be consulted to determine which of the pop-up windows that key sequence pertains to. Proper actions can then be taken to bring focus to the correct toolbar or to close the correct pop-up window, as appropriate. (Closing a toolbar's pop-up window is discussed below, with reference to Blocks 260 and 265.)

When the test in Block 220 has a negative result, indicating that the user's input did not request launching the toolbar, Block 240 tests to see if the key sequence is a request to launch a different detached control. If this test has a positive result, control transfers to Block 245, where the detached control is launched; otherwise, processing continues at Block 260. For example, if Block 240 detects the key sequence 17, 16, this indicates that Block 245 should launch a color-picker function, according to the mapping at 540 in FIG. 5. (Individual decision blocks may be provided to test for each control defined as a child of the <createEditor> tag, if desired.) Refer to the discussion of FIG. 6, below, for more information about launching and using a color-picker.

Block 250 attempts to load the requested control from a repository. This approach may be used for a number of different types of controls, an example of which is the color-picker that has been discussed, which require additional input beyond a simple selection from a toolbar. Because the dialogs used for the color-picker (and other types of controls that require additional input and may therefore be handled using the "yes" branch from Block 240) are full-fledged user interfaces, they must themselves be accessible and thus suffer from the same accessibility concerns which have been discussed.

In preferred embodiments, these "additional input" controls have special handling because of the difficulty in maintaining multiple modal pop-up dialog windows for providing accessibility. For example, if a color-picker was launched from a detached toolbar, it would be difficult to maintain focus properly between all three windows (i.e., the editor, the toolbar, and the color-picker) because all of the windows would be fighting for modality. Accordingly, preferred embodiments enable other controls to be defined for an editor instance (as discussed above with reference to the <addControl> tag 350 in FIG. 3), where these controls will pop up in a modal dialog, responsive to a corresponding key sequence definition, to allow additional user input before applying changes to the document.

A number of differences in various UI components may be found among browsers. To accommodate these differences yet provide a solution for accessibility, preferred embodiments enable specifying a number of alternative implementations for a particular control within the repository that is to be accessed at Block 250. Several different color-pickers might be provided, for example. To select among the alternatives, preferred embodiments associate an identifier with each control implementation in the repository, and the "definition" attribute on the <addControl> tag that specifies this control preferably begins with a special character string, such as "id:", to signify that the identifier of a repository-stored control is being referenced, as stated earlier. Thus, the syntax 'definition="id:colorpicker"' at 350 in FIG. 3 points to the identifier "colorpicker" of an element stored in the repository. The identifier from this attribute is therefore used to access the repository, and the associated code is executed (rendering, for example, a color-picker as discussed below with reference to FIG. 6).

The processing shown in Block 255 is an optional aspect of preferred embodiments, and may be used if Block 250 determines that an implementation for this control is not available in the repository. In this optional aspect, an "accessibility coercion" approach is used, whereby an attempt is made to correct for several anticipated accessibility issues. This automated-corrections approach is useful for already-written Web page content, where it may be quite difficult to locate each problematic portion of the content and make accessibility corrections manually, as well as for content where the source is unavailable and therefore cannot be corrected. Preferably, definitions from the Web Accessibility Initiative of the W3C (as discussed in the working draft and recommendations mentioned earlier) are used as guidelines for defining transformations that programmatically transform tags in the HTML Web page markup to enforce accessibility. In preferred embodiments, these transformations are applied using style sheets (e.g., via Extensible Stylesheet Transformations, or "XSLT", the processing of which is well known in the art). Two examples of coercions that can be applied during the processing of Block 255 will now be described, by way of illustration but not of limitation of the types of coercions that may be available with an embodiment of the present invention.

First, a text equivalent may be programmatically supplied for non-text elements in the Web page definition. For example, if an image tag (having syntax "<img . . . >") is encountered, an alternative means of conveying the information (rather than using the image, which cannot be processed by a screen reader) is to programmatically supply the file name of that image. HTML provides an "alt" (i.e., alternative) attribute on an <img> tag, the purpose of which is to provide a textual alternative. Preferred embodiments therefore obtain the file name from the "src" (i.e., source) attribute of the image, which specifies where to find the image itself, and create an "alt" attribute where the value is this file name (excluding the directory, preferably). Often, the file name can imply something about the image, and thus a screen reader can read the value of this "alt" attribute to the user.

Second, forms may be made more accessible to assistive technology through accessibility coercion. For example, if an "<input . . . >" tag is encountered in the Web page definition, that syntax is preferably changed programmatically to a <label> tag. The value associated with that <input> tag (for example, via the "name" attribute) is then programmatically supplied as the value of an attribute (which, for example, may be named "for") of the <label> tag, and the value of the <label> tag is preferably that value from the original <input> tag. So, if the following tag <input type="text" name="xyz" id="xyz" . . . /> was found in the Web page definition, that tag might be changed to

<input type="text" name="xyz" id="xyz" . . . />
 <label for="xyz">xyz</label> by the processing of Block 255. As another example, if the following text

MyField<input type="text" name="xyz" id="xyz" . . . /> was found in the Web page definition, that text might be changed to

```
<input type="text" name="xyz" id="xyz" . . . />
    <label for="xyz">MyField</label>
``` by the processing of Block 255.

While this accessibility coercion approach will not address all recommended accessibility guidelines, it can dramatically improve the user's experience when editing content accessed (for example) with a screen reader.

Following completion of Block 255, control transfers to Block 230, in preferred embodiments, to intercept the user's next keyboard input. (Alternatively, it may be desirable to duplicate the functionality of Blocks 230 and 235 following Block 255, for example to provide processing that accounts for context-dependent differences between processing toolbar selections and selections from an independently-launched control such as a color-picker.)

Although not illustrated in the examples herein, a key sequence is preferably defined with which the user can explicitly request to close the open pop-up window for a toolbar. The test in Block 260 addresses this scenario, following a negative result for the test in Block 240, and checks to see if the key sequence trapped at Block 215 was the close-toolbar key sequence. If so, the pop-up window for that toolbar is closed (Block 265), after which control returns to Block 215.

If the test in Block 260 has a negative result, then the trapped input (which may be a browser command, for example) is processed as in the prior art at Block 270. After completion of Block 270, control returns to Block 215 to trap the user's next keyboard input (unless the input processed at Block 270 was a request to end processing, in which case the editor instance will be shut down).

Figure 6A:
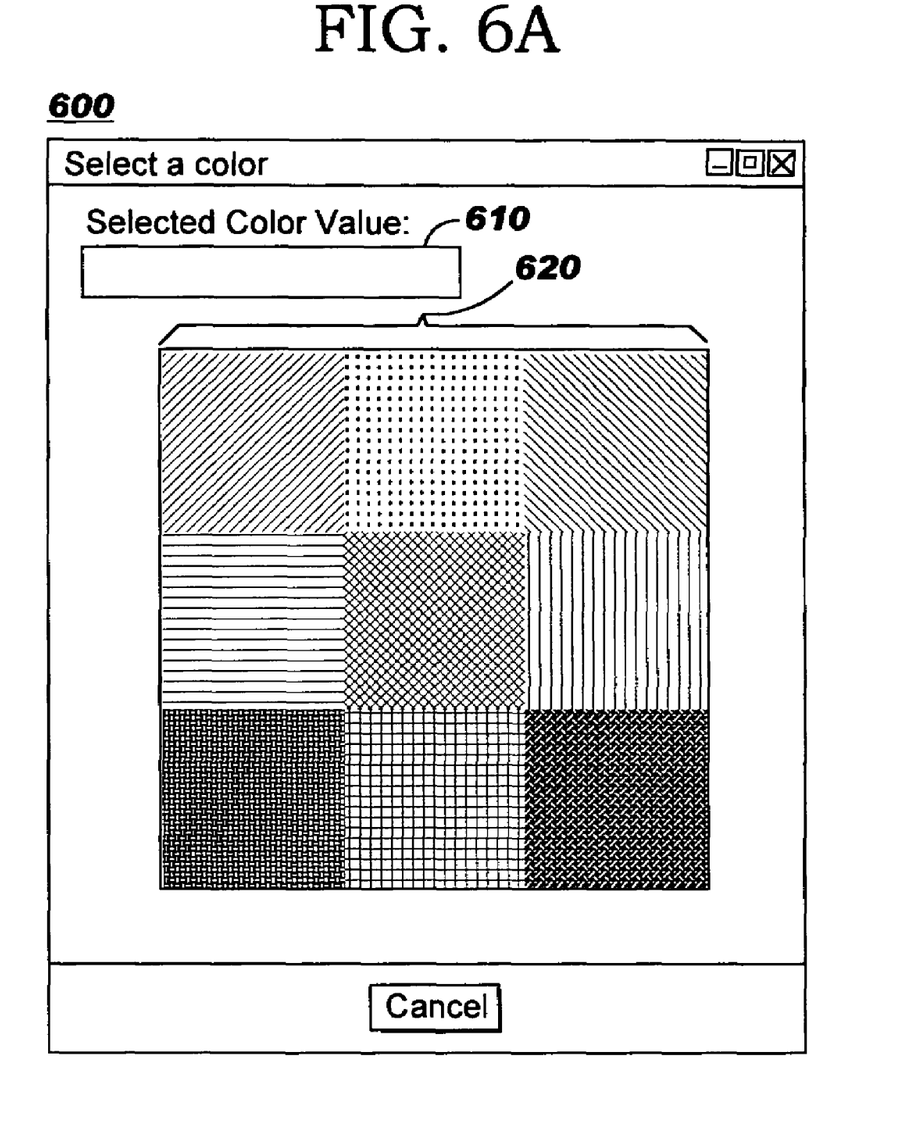
Figure 6B:
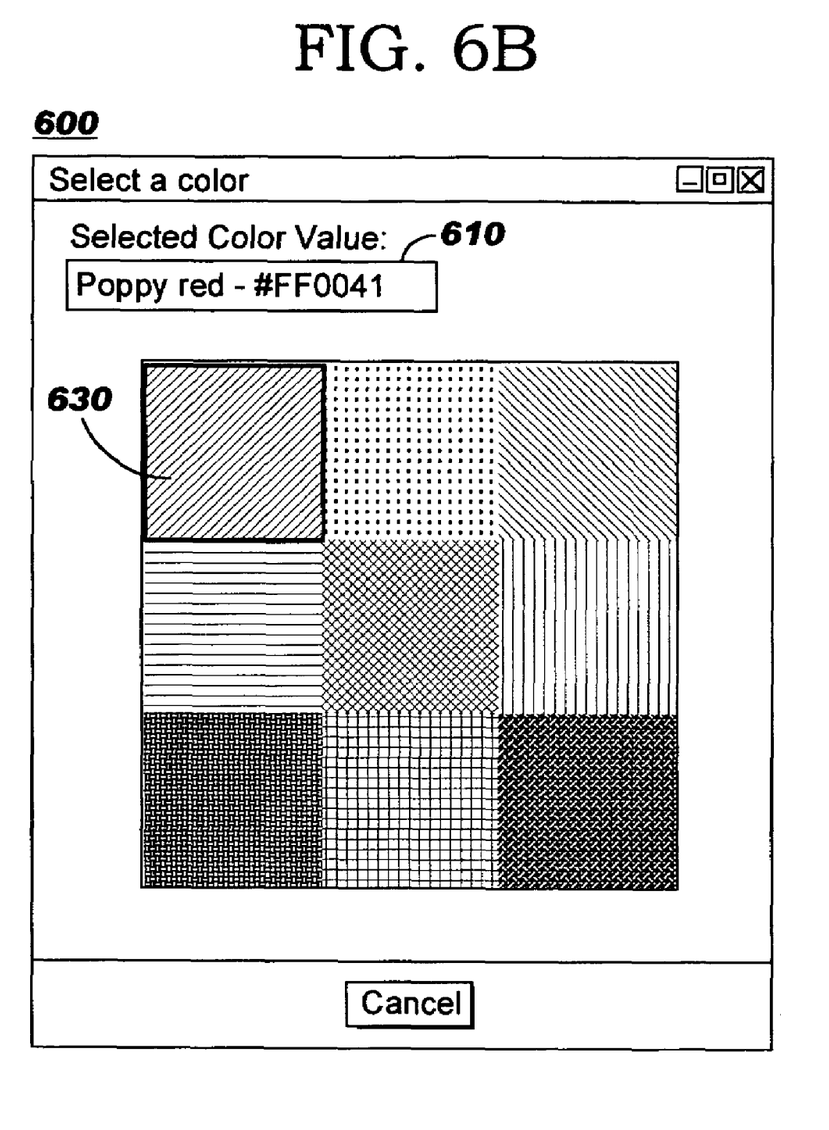

Referring now to FIG. 6 (comprising FIGS. 6A and 6B), an illustration of a pop-up color-picker window 600 according to preferred embodiments is provided. As stated earlier, preferred embodiments use a single image, comprised of a number of different color swatches that appear to be independent, and overlay this image with invisible mapping regions. FIG. 6 uses various styles of hashing instead of different colors to present the color-picker image 620 within the window, as different colors cannot be perceived adequately in the printed figure. In actual practice, the hashing will be replaced with swatches of color, and a color-picker image will typically have many more different choices than the 9 choices which are illustrated in the sample image at 620.

Referring now to FIG. 6B, suppose the user navigates to the square 630—that is, to the invisible mapping region that is positioned over square 630—and then presses a selection key sequence. (A dark rectangle has been used in FIG. 6B to illustrate the boundary of square 630, although this dark rectangle would not typically appear in an actual embodiment of the present invention; instead, an actual implementation preferably uses the browser's normal approach to visually adjusting the display to indicate which region has been selected.) Preferably, tab or arrow keys are used for navigating among the regions of the color-picker image, and an "Enter" or "Return" key is used to signal the user's selection, as with existing browser selection techniques. Preferred embodiments associate each of the mapping regions with an appropriate action based on the underlying portion of the image, and selection of one of the regions then causes the associated action to be carried out. Thus, if the hash pattern at 630 was actually a representation of the color "Poppy red", which is shown in FIG. 6B as having an associated color identifier of "FF0041", the dialog box at 610 is automatically updated to display the color name (and optionally the color identifier) responsive to the user's selection of the region overlaying square 630. (In addition, the underlying action presumably sets the selected document portion to the selected color, in an analogous manner to the way in which prior art color-pickers operate.)

Note that while preferred embodiments use invisible mapping regions, in an alternative approach, it may be desirable to provide some visual indication of the mapping regions, such as a dashed outline corresponding to the boundary of each region.

In some cases, the original image used for the color-picker may be too small for low-vision users or users with various types of assistive devices. Accordingly, in an optional aspect, preferred embodiments may enable dynamically enlarging the image. In this case, the overlaying mapping regions must also be enlarged proportionally. Preferably, this is done at load time by setting the image map's logical size to an appropriate size and then recalculating the boundaries of each mapping region.

As has been demonstrated, the present invention provides techniques that enable accessibility compliance within advanced componentry. While preferred embodiments have been described herein as supporting both detached toolbars and detached controls that include color-pickers rendered as images, alternative implementations may support only one of these features, without deviating from the scope of the present invention. In addition, other types of detached controls may be supported in addition to, or instead of, the detached color-picker. Preferred embodiments are described in terms of using an on-demand editor for content interactions, although embodiments of the present invention may be used with other types of content viewers without deviating from the inventive techniques disclosed herein.

As will be appreciated by one of skill in the art, embodiments of the present invention may be provided as methods, systems, computer program products, or services. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of dynamically configuring an accessible editor, comprising using computer-readable program code executing on a computer to perform steps of:
    providing a plurality of selectable editing functions;
    specifying, in computer-readable storage media for a particular instance of the accessible editor, selected ones of the provided editing functions that are to be available in this editor instance; and
    upon activating the editor instance, processing the specification from the computer readable storage media to determine the selected ones and dynamically making the determined selected ones available for selection in the editor instance.

2. The method according to claim 1, wherein the available selected ones are available, to a user of the editor instance, using only keyboard input.

3. The method according to claim 1, wherein each of the available selected ones is selectable from the editor instance using a predetermined sequence of one or more keys.

4. The method according to claim 3, wherein the predetermined key sequence for each of the available selected ones is specified in a mapping between the specified selected ones and the predetermined key sequences.

5. The method according to claim 3, wherein the predetermined key sequence for each of the available selected ones is dependent upon a locale in which the editor instance is activated.

6. The method according to claim 3, wherein the predetermined key sequence for each of the available selected ones is dependent upon a user agent from which the editor instance is activated.

7. The method according to claim 1, wherein at least one of the selected ones operates to enable activating a detached toolbar.

8. The method according to claim 7, wherein the selected ones also include at least one editing function that applies to a document portion selected in the editor instance.

9. The method according to claim 7, wherein the detached toolbar is automatically launched, responsive to detecting a predetermined key sequence that is defined as causing the automatic launch.

10. The method according to claim 9, wherein focus for user input switches to the detached toolbar when the toolbar is launched, without altering a current selection status of content rendered in the editor instance.

11. The method according to claim 1, wherein at least one of the selected ones operates to enable applying an action to a document portion selected in the editor instance.

12. The method according to claim 1, wherein at least one of the selected ones operates to enable activating a detached color-selection mechanism in which a selection can be made from among a plurality of colors provided as a single image, such that the plurality of colors is unaffected by color contrast changes made to a device on which the editor instance is activated.

13. The method according to claim 1, wherein:
    at least one of the selected ones operates to enable activating a detached color-selection mechanism in which a selection can be made from among a plurality of colors;
    the plurality of colors is provided as a single image; and
    the selection is facilitated by providing mapping regions, each of which has a boundary that generally corresponds to a boundary of a different one of the colors.

14. The method according to claim 13, wherein the regions are invisible.

15. The method according to claim 1, further comprising the step of programmatically modifying a document rendered in the editor instance to enforce predetermined accessibility issues.

16. The method according to claim 15, wherein the programmatically modifying step further comprises the step of programmatically altering image references in the document to include a textual description of a source of the referenced image.

17. The method according to claim 15, wherein the programmatically modifying step further comprises the step of programmatically changing input areas of forms in the document to textual labels that include, as values, text from the input areas.

18. The method according to claim 15, wherein the programmatically modifying step further comprises the step of applying a style sheet that specifies the programmatic modifications.

19. The method according to claim 1, further comprising the step of providing a service wherein one or more of the providing, specifying, and processing and dynamically making steps are carried out by a third party.

20. The method according to claim 1, further comprising the step of providing a service wherein one or more of the providing, specifying, and processing and dynamically making steps are carried out for compensation.

21. A method of dynamically configuring an accessible content viewer, comprising using computer-readable program code executing on a computer to perform steps of:
    providing a plurality of selectable functions;
    specifying, in computer-readable storage media for a particular instance of the accessible content viewer, selected ones of the provided functions that are to be available in this content viewer instance; and
    upon activating the content viewer instance, processing the specification from the computer-readable storage media to determine the selected ones and dynamically making the determined selected ones available such that each of the available selected ones is selectable from the content viewer instance using a predetermined sequence of one or more keys.

22. A system for dynamically configuring an accessible content viewer, comprising:
- a plurality of selectable functions;
- a specification, for a particular instance of the accessible content viewer, of selected ones of the provided functions that are to be available in this content viewer instance;
- a computer comprising a processor; and
- instructions which are executable, using the processor, to perform:
  - processing the specification to determine the selected ones and dynamically making the determined selected ones available, upon activation of the content viewer instance; and
  - determining, when user input is received, which of the available selected ones should be activated by consulting a mapping that associates each of the specified selected ones with a predetermined sequence of one or more keys usable for providing user input.

23. A computer program product for dynamically configuring an accessible content viewer, the computer program product embodied on one or more computer readable storage media having computer-readable program code embodied therein for:
- providing a plurality of selectable functions;
- specifying, for a particular instance of the accessible content viewer, selected ones of the provided functions that are to be available in this content viewer instance; and
- processing the specification to determine the selected ones and dynamically making the determined selected ones available, upon activation of the content viewer instance, such that each of the available selected ones is selectable from the content viewer instance using a predetermined sequence of one or more keys.

* * * * *

UNITED STATES PATENT AND TRADEMARK OFFICE
CERTIFICATE OF CORRECTION

PATENT NO. : 7,657,844 B2  Page 1 of 1
APPLICATION NO. : 10/836883
DATED : February 2, 2010
INVENTOR(S) : Gibson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1476 days.

Signed and Sealed this

Twenty-eighth Day of December, 2010

David J. Kappos
*Director of the United States Patent and Trademark Office*